G. L. Squier.

Straw Cutter.

Nº 12,331. Patented Jan. 30, 1855.

UNITED STATES PATENT OFFICE.

GEO. L. SQUIER, OF CHICOPEE FALLS, MASSACHUSETTS.

STRAW-CUTTER.

Specification of Letters Patent No. 12,331, dated January 30, 1855.

*To all whom it may concern:*

Be it known that I, G. L. SQUIER, of Chicopee Falls, in the county of Hampden and State of Massachusetts, have invented a new and Improved Machine for Cutting Straw, Corn-Stalks, Hay, &c.; and I do hereby declare that the following is a full, clear, and exact description of the construction and operation of the same, reference being had to the annexed drawings, making a part of this specification, in which—

Figure 1:
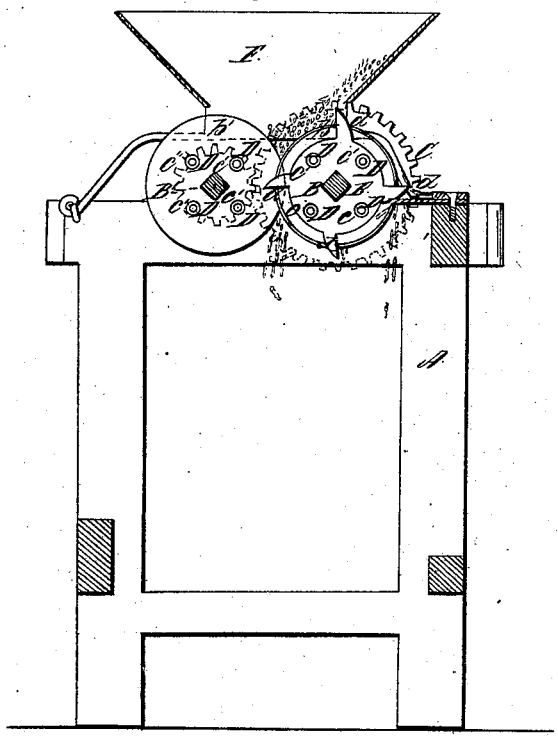
Figure 2:
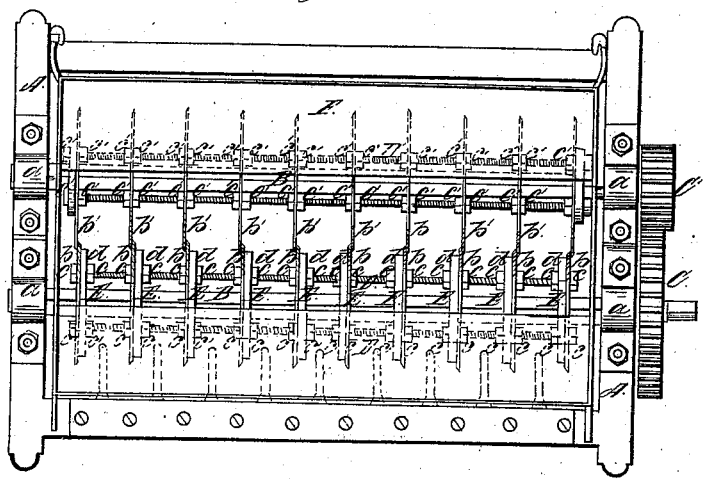

Figure 1, is a transverse vertical section of my improved machine. Fig. 2, is a plan or top view of ditto.

Similar letters of reference indicate corresponding parts in the two figures.

The nature of my invention consists in the combination of circular knives or cutters and finger plates, attached to their shafts or arbors in a peculiar manner and otherwise arranged as will be hereafter shown and described.

To enable others skilled in the art to make and use my invention I will proceed to describe its construction and operation.

A represents a rectangular frame constructed of either wood or metal, and having upon its upper part two parallel shafts or arbors B, B′ of rectangular shape, the shafts or arbors working in suitable bearings (*a*) on the upper part of the frame.

C, C′ represent toothed wheels at one end of the shafts or arbors B, B′, one wheel C being larger than the other one C′ and consequently giving a more rapid movement to the shaft or arbor B′, the shaft or arbor B being the driving shaft or the one to which the power is applied. On each of the shafts or arbors there is placed a series of circular cutters or knives (*b*) (*b′*) of such size that one set will overlap the other a trifle, that is their edges, the edges of the cutters or knives being formed by a bevel and made either smooth, serrated like a sickle, or formed with teeth similar to a saw according to the nature of the article to be cut. The cutter or knives have square openings through their centers through which the shafts or arbors pass, and they are secured upon the shafts or arbors the requisite distance apart by means of screw rods D′ which pass through the cutters or knives and have nuts (*c′*) upon them at each side of the cutters, the nuts keeping the cutters in proper position. Any number of screw rods D may be used, four are represented in the drawings, which number would probably be sufficient in all cases.

The shaft or arbor B′ has only cutters or knives (*b′*) upon it, but the shaft or arbor B has also finger plates E upon it. The plates E are of circular form somewhat less in diameter than the cutters or knives (*b*) and have fingers (*d*) upon their peripheries which fingers project beyond the edges of the cutters or knives (*b*) and overlap the edges of the cutters or knives (*b′*) on the shaft or arbor B′. Four fingers are represented attached to each plate E but more or less may be used as occasion requires. The plates E have square openings through their centers similar to the cutters or knives (*b*) through which the shaft or arbor B passes, and the plates are secured to the sides of the cutters or knives (*b*) by nuts (*c*) on screw rods D′ precisely similar to the nuts or rods by which the cutters or knives (*b′*) are secured the proper distance from each other.

F is a hopper placed on the top of the frame A directly above the two sets of cutters or knives (*b*) (*b′*). The straw, corn stalks, or other article to be cut is placed lengthwise in the hopper F and power being applied to the shaft or arbor B the two sets of cutters or knives (*b*) (*b′*) are made to rotate, the cutters (*b′*) rotating with a quicker motion than the cutters (*b*) and the straw or article is fed between the two sets of cutters by the fingers (*d*) and the whole length of the article is cut at once into pieces of the desired length corresponding to the distance between the cutters, and a drawing cut is obtained in consequence of one set of cutters rotating faster than the other.

This machine requires less power in proportion to the amount of work it performs than other machines for the same purpose, the cutters may be adjusted any distance apart upon the shafts or arbors by operating the nuts (*c*) (*c′*) and the article may be cut of any desired length, and different lengths may be cut at the same time if desired, by adjusting a portion of the cutters at a different distance apart, from the other portion. The knives or cutters may be readily sharpened and new ones adjusted to the shafts or arbors when required.

I do not claim separately the circular cutters or knives, for they have been used for analogous purposes, but

What I claim as new and desire to secure by Letters Patent, is—

The combination of the circular cutters or knives (*b*) (*b'*) and finger plates E with the fingers (*d*) attached to them, when said cutters and finger plates are secured the proper distance from each other on their shafts B, B', by means of the rods D, D' and nuts (*c*) (*c'*) as herein shown and described.

GEO. L. SQUIER.

Witnesses:
M. D. WHITAKER,
E. HUNTINGTON.